United States Patent [19]

Gall

[11] Patent Number: 4,678,454
[45] Date of Patent: Jul. 7, 1987

[54] INERTIA CONTROLLED LOADING SYSTEM

[75] Inventor: John C. Gall, Chicago, Ill.

[73] Assignee: Sears, Roebuck & Co., Chicago, Ill.

[21] Appl. No.: 879,530

[22] Filed: Jun. 23, 1986

Related U.S. Application Data

[63] Continuation of Ser. No. 683,677, Dec. 19, 1984, abandoned.

[51] Int. Cl.⁴ ............................................. F16H 7/08
[52] U.S. Cl. .................................. 474/101; 474/111; 474/135
[58] Field of Search ............... 474/101, 111, 135, 140

[56] References Cited

U.S. PATENT DOCUMENTS

| | | | |
|---|---|---|---|
| 389,835 | 9/1888 | Cooley | 474/111 |
| 3,115,046 | 12/1963 | Bliss et al. | 474/111 |
| 3,811,332 | 5/1974 | Brown et al. | 474/111 |

FOREIGN PATENT DOCUMENTS

| | | | |
|---|---|---|---|
| 353797 | 1/1931 | United Kingdom | 474/111 |
| 628803 | 9/1949 | United Kingdom | 474/111 |

Primary Examiner—James A. Leppink
Assistant Examiner—David J. Bagnell
Attorney, Agent, or Firm—Wood, Dalton, Phillips Mason & Rowe

[57] ABSTRACT

An inertia controlled loading system for an exercise apparatus or the like. The system includes a rotatable member mounted on a frame together with a mechanism for rotating the rotatable member through a drive pulley operatively associated with the rotating mechanism and a driven pulley operatively associated with the rotatable member. It also includes an endless belt member drivingly interconnecting the pulleys such that the belt member imparts rotation of the rotating mechanism to the rotatable member through the drive and driven pulleys which occurs because of the fact that the belt member has a surface in driving engagement with the pulleys. The system further includes a non-rotating frictional surface member in engagement with the belt member intermediate the drive and driven pulleys. With this construction, the inertia controlled loading system is suitable for an exercise apparatus or the like.

22 Claims, 3 Drawing Figures

INERTIA CONTROLLED LOADING SYSTEM

This is a continuation of co-pending application Ser. No. 683,677 filed on Dec. 19, 1984 now abandoned.

BACKGROUND OF THE INVENTION

The present invention generally relates to an inertia controlled loading system and, more particularly, to an inertia controlled loading system for an exercise apparatus or the like.

For many years, the benefits from use of an exercise apparatus in the form of a stationary bicycle have been known and appreciated. Such apparatus characteristically have mechanical braking means to simulate and vary bicycle pedal loading and a speedometer and odometer by means of which the user can monitor performance objectives. In most cases, these apparatus have a wheel or flywheel to provide inertial effects whereby the wheel or flywheel is commonly driven by means of a chain drive connected to a pedal driven sprocket. Such apparatus commonly apply a form of mechanical braking means to provide resistance of the type generally associated with bicycle pedal loading near or on the periphery of the wheel or flywheel. Although this design approach allows lower braking forces at higher speeds, it also dictates that the entire drive system be operated under substantial load.

In order to overcome the problems in the art, it is an object of the present invention to provide an inertia controlled loading system which minimizes the braking loads on the transmission means. Still other objects of the present invention will be apparent from a consideration of the details of construction and operation set forth hereinafter.

SUMMARY OF THE INVENTION

The present invention is directed to an inertia controlled loading system for use in an exercise apparatus in the form of a stationary bicycle. The system includes a rotatable member mounted on a frame together with means for rotating the rotatable member through a drive pulley operatively associated with the rotating means and a driven pulley operatively associated with the rotatable member. It also includes an endless belt member drivingly interconnecting the pulleys so as to impart rotation of the rotating means to the rotatable member through the drive and driven pulleys by means of the inner surface of the belt member being in driving engagement with the pulleys. The system further includes non-rotating frictional surface means in engagement with the belt member intermediate the drive and driven pulleys for imparting a resistnace to rotation of the rotating means. With this construction, the present invention is able to overcome the problems with exercise apparatus where brake means is applied to the wheel or flywheel.

In a preferred embodiment, a lever arm is pivotally mounted on the frame and the non-rotating frictional surface means is mounted on the lever arm in fixed relation thereto. The lever arm preferably has one end pivotally mounted on the frame with the surface means comprising a pair of arcuate surfaces in engagement with the belt member. With this arrangement, one of the arcuate surface will be in engagement with each of the inner and outer surfaces of the belt member.

Preferably, one of the arcuate surfaces is mounted at the one end of the lever arm and the other of the arcuate surfaces is mounted intermediate the ends of the lever arm so as to be movable with the lever arm relative to the belt member. In particular, the arcuate surface mounted at the one end of the lever arm is suitably in engagement with the inner surface for the belt member and the arcuate surface mounted intermediate the ends of the lever arm is in engagement with the outer surface of the belt member. Still more specifically, one of the arcuate surfaces faces generally perpendicular to the lever arm in one direction while the other of the arcuate surfaces faces generally perpendicular to the lever arm in the opposite direction.

In the preferred embodiment, means are provided for applying a force to the other end of the lever arm by which tension is provided in the belt member. In particular, the force is directed generally perpendicular to the lever arm at a distance from the pivotal mounting in moment arm fashion thereby causing the arcuate surface intermediate the ends of the lever arm in cooperation with the other arcuate surface to apply tension to the belt member and, thus, apply frictional resistance to rotation of the pedal means through the other operative components. With this arrangement, the force applying means includes a spring extending from the lever arm to the frame and means operatively associated with the spring for adjusting the tension in the belt member.

With this understanding, the features of the present invention will become even more apparent from a consideration of the detailed description which follows when taken in conjunction with the accompanying drawings.

DETAILED DESCRIPTION OF THE PREFERRED EMBODIMENTS

Figure 2:
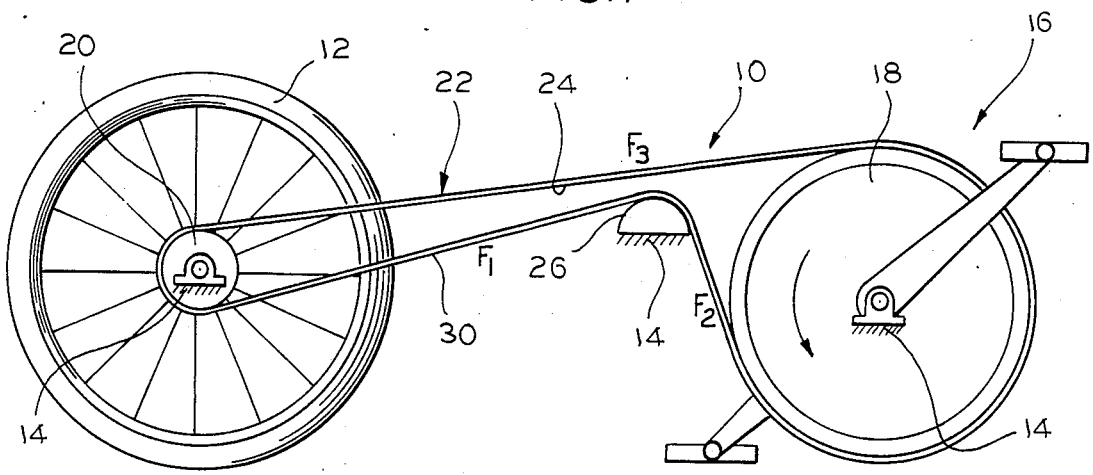
FIG. 2 is a side elevational view of the operative components of a basic inertia controlled loading system embodiment in accordance with the present invention.

Referring to FIG. 2, the reference numeral 10 designates generally a basic inertia controlled loading system in accordance with the present invention. The system 10 includes a rotatable member 12 together with means for rotating the rotatable member 12 such as the pedal means 16 both of which are mounted on portions of the frame 14 (shown schematically). It also includes a drive pulley 18 operatively associated with the rotating means or pedal means 16 and a driven pulley 20 operatively associated with the rotatable member 12. The system 10 further includes an endless belt member 22 drivingly interconnecting the drive and driven pulleys 18 and 20, respectively, both of which are mounted on portions of the frame 14. As will be appreciated, rotation of the pedal means 16 is imparted to the rotatable member 12 (which in the case of an exercise apparatus such as a stationary bicycle comprises a wheel or flywheel) by means of the cooperation of the belt member 22 with the drive and driven pulleys 18 and 20, respectively.

Still referring to FIG. 2, the system 10 also includes non-rotating frictional surface means such as the arcuate surface 26, the non-rotating frictional surface means being in engagement with the belt member 22 on the tension side thereof intermediate the drive and driven pulleys 18 and 20 to impart a resistance to rotation of the rotating means or pedal means 16. The system 10 may further include means for adjusting the tension in the belt member 22 such as the spring biased lever arm assembly 28 (shown in FIG. 3). With this construction, the system 10 is well suited for use in an exercising apparatus in the form of a stationary bicycle although it may be utilized in any system requiring a resistance to rotation under certain conditions.

In the basic embodiment illustrated in FIG. 2, the arcuate surface 26 is mounted in fixed relation on the frame 14 in engagement with the outer surface 30 of the belt member 22. It will be appreciated, of course, that, while this provides loading on the system 10, the tension on the belt member 22 and, thus, the resistance to rotation of the pedal means 16 is fixed or constant since the arcuate surface 26 cannot be moved relative to the belt member 22 in this embodiment. Still referring to the basic embodiment illustrated in FIG. 2, the inner surface 24 of the belt member 22 is in engagement with the drive and driven pulleys 18 and 20 to impart rotation of the pedal means 16 to the wheel or flywheel.

Figure 3:
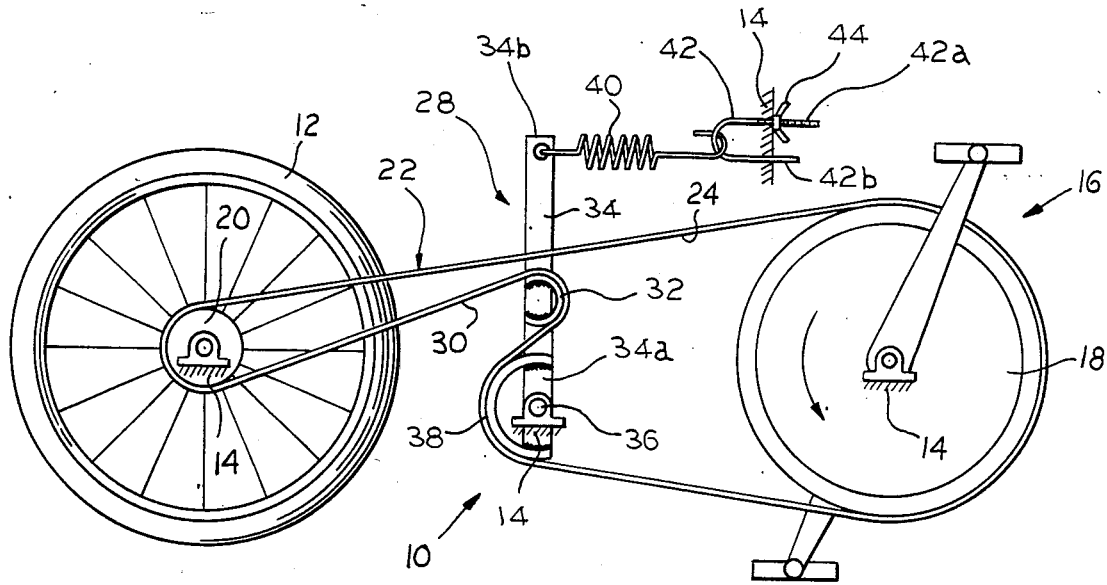
FIG. 3 is a side elevational view of the operative components of a preferred inertia controlled loading system embodiment in accordance with the present invention.

Referring to FIG. 3, the non-rotating frictional surface means includes an arcuate surface 32 mounted relative to the frame 14 so as to be movable relative to the belt member 22. It will be seen that, again, the arcuate surface 32 is in engagement with the outer surface 30 of the belt member 22 and, in particular, the arcuate surface 32 is movable toward and away from the belt member 22 to adjust the tension in the belt member. As will be appreciated, the tension in the belt member 22 controls the loading on the pedal means 16, i.e., the frictional resistance to rotation of the pedal means 16 is a direction function of the tension in the belt member 22.

Still referring to FIG. 3, the lever arm assembly 28 preferably includes a lever arm 34 pivotally mounted on the frame 14 with the arcuate surface 32 being mounted on the lever arm 34 in fixed relation thereto. In particular, the lever arm 34 advantageously has one end 34a pivotally mounted on the frame 14 as at 36 and means are provided for applying a force to the other end 34b of the lever arm 34 to provide tension in the belt member 22. Moreover, a second arcuate surface 38 may also be provided as a portion of the lever arm assembly 28 so as to engage the belt member 22 as shown in FIG. 3.

With the embodiment illustrated in FIG. 3, one of the arcuate surfaces 32 is in engagement with the outer surface 30 of the belt member 22 and the other of the arcuate surfaces 38 is in engagement with the inner surface 24 of the belt member 22 such that the belt member 22 passes over the arcuate surfaces 32 and 38 in serpentine fashion. It will also be appreciated that the means for applying a force to the end 34b of the lever arm 34 is such that the force is directed generally perpendicular to the lever arm at a distance from the pivotal mounting in moment arm fashion and is such as to urge the arcuate surfaces 32 and 38 against the respective surfaces 30 and 24 of the belt member 22. As will be appreciated, the force applying means causes the arcuate surface 32 intermediate the ends 34a and 34b of the lever arm 34 in cooperation with the arcuate surface 38 to apply tension to the belt member 22 and, thus, frictional resistance to rotation of the pedal means 16 through the other operative components.

In the preferred embodiment, the force applying means includes a spring 40 extending from the end 34b of the lever arm 34 to the frame 14. It will be seen that the lever arm assembly 28 also includes means for adjusting the spring 40 to adjust the tension in the belt member 22, for example, a threaded U-bolt 42 which may be mounted on the frame 14 such that the spring 40 extends between the end 34b of the lever arm 34 and the U-bolt 42. With this arrangement, the spring 40 may be joined to both the lever arm 34 and the U-bolt 42 in conventional fashion.

Also as shown, the U-bolt 42 may have one elongated threaded leg 42a extending through a first hole in the frame 14 with the other leg 42b being significantly shorter but of sufficient length to extend through a second hole in the frame 14. Additionally, the U-bolt 42 is preferably threadingly adjustable by means of a wing nut 44 on the elongated threaded leg 42a to increase and decrease the spring tension. As a result, the force of engagement of the arcuate surfaces 32 and 38 with the respective surfaces 30 and 24 of the belt member 22 may be increased or decreased by simply threading or unthreading the wing nut 44 on the elongated leg 42a of the U-bolt as will be appreciated from FIG. 3.

With regard to the frame 14, it will be appreciated that is has been shown schematically in the drawings since the exact construction is not important to an understanding of the present invention. It will also be appreciated that only portions of the frame 14 have been illustrated and that the frame will, in practice, either be a unitary member or will be comprised of components normally fixed in relation to one another. Moreover, it will be appreciated that the remainder of the exercise apparatus can be conventional in design and has been omitted from the drawings for clarity in understanding the present invention.

Figure 1:
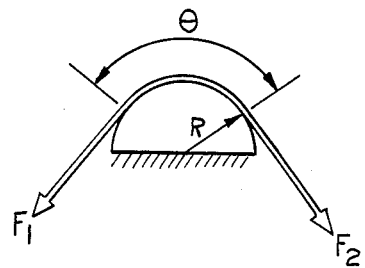
FIG. 1 is a schematic view illustrating the basic theory behind inertia controlled loading systems in accordance with the present invention.

Referring to FIG. 1, the basic theory of the present invention can be understood. If an arcuate surface of radius R is wrapped with a friction belt in contact over angle $\theta$, the reaction torque will be $T=R(F_1-F_2)$ up to the limit of frictional resistance where slippage occurs. If the angle $\theta$ and the coefficient of friction remain constant, the tensions $F_1$ and $F_2$ will be related by the expression $F_1/F_2=e^{f\theta}=$ constant while slippage occurs. Since $F_1$ and $F_2$ can change in magnitude while maintaining the constant ratio, the reaction torque can be varied by changing the belt tension. If during slippage, $F_2$ is increased, $F_1$ will increase proportionally by the stated ratio.

Referring to FIG. 2, if a drive system for an exercise bike were rotatably driven in the direction illustrated, it can be seen that $F_1$ will be the highest tension with $F_2$ being lower by the ratio $F_1=F_2e^{f\theta}$ and $F_3$ will be the lowest tension or the slack side of the drive system with the frictional resistance across the arcuate surface 26 being a function of the tension in the belt member 22. If operated at constant speed without inertial effects of the rotatable member 12, the driver torque is a function of $(F_1-F_3)$ and since $F_1$ is a function of $F_2$ by the constant ratio, the driver torque is a function of $(CF_2-F_3)$, and with any change in speed of the rotatable member 12 an inertial change will occur which will be reflected in a change in $F_2$, such change being multiplied to a torque change in the driver.

With the present invention, the inertia controlled loading system is particularly well suited for an exercise apparatus or the like. It overcomes the problems associated with prior exercise apparatus, particularly those in the form of a stationary bicycle, by minimizing any braking load or tensil force on the transmission means other than inertial effects since there are no mechanical braking means applied near or on the periphery of the rotatable wheel or flywheel member or, for that matter, anywhere on the flywheel. Instead, the flywheel is driven by a belt while an inertia controlled loading system is provided to impart resistance to rotation, the belt being the only frictional member employed, i.e., both the drive friction and the loading friction are provided through the belt.

Moreover, the present invention has overcome the additional problem with exercise bicycles of economically providing the maximum amount of inertia for smooth pedaling action. As a general rule, the best exercise bicycles have utilized large flywheels for this purpose and such units obviously entail additional materials, handling, and shipping costs. With the present invention, a consistant and reliable system is provided in a form that minimizes materials, handling, and shipping costs while accomplishing the overall objective of providing smooth pedaling action.

While the present invention is well suited for an exercise apparatus, it may also be used in any system requiring a resistance to rotation under certain conditions. The approach of the present invention, particularly for an exercise apparatus of the stationary bicycle type, should reduce the cost of manufacture, eliminate pedal load variations due to wheel or flywheel runouts, and provide a smoother, quiter operation, particularly in view of the fact that the belt member is merely circumferentially or tangentially in contact with the arcuate surfaces of the non-rotating frictional surface means. Due to the elimination of chains and sprockets, the operation is smooth, quiet, effective and inexpensive.

Variations of the details herein given may be made by those skilled in the art without departing from the spirit and scope of the present invention as defined by the appended claims.

I claim:

1. In a controllable loading system having a rotatable member mounted on a frame together with means for rotating the rotatable member, a drive pulley operatively associated with the rotating means and a driven pulley operatively associated with the rotatable member, and an endless belt member drivingly interconnecting the drive and driven pulleys, the belt member imparting rotation of the rotating means to the rotatable member through frictional resistance relative to the drive and driven pulleys, the belt member having a surface in frictional driving engagement with the drive and driven pulleys and having a tension side and a slack side, the improvement comprising:

means for providing a resistive load on the tension side of the belt member, said resistive load means including tension adjusting means for providing a fixed resistive load on the rotating means at any given constant speed of the rotatable member, the resistive load on the rotating means normally increasing or decreasing during any acceleration or deceleration of the rotatable member until the rotatable member again reaches a constant speed, said resistive load means also including friction altering means for providing enhanced variations in resistive load on the rotating means during any changes in speed of the rotatable member;

said tension adjusting means being operatively associated with said friction altering means and the belt member being in arcuate engagement with said friction altering means on the tension side thereof;

the variations of resistive load resulting from changes in speed of the rotatable member through the rotating means and the belt member being multiplied by a factor dependent upon the angle of arcuate engagement of the belt member with said friction altering means to provide the enhanced variations in resistive load;

whereby the torque on the rotating means required to rotate the rotatable member through the belt member can be varied for both constant speed and changing speed operation by the controllable loading system.

2. The controllable loading system as defined by claim 1 wherein said friction altering means is mounted on the frame in fixed relation to the belt member, the friction altering means having an arcuate surface in frictional engagement with the belt member.

3. The controllable loading system as defined by claim 2 wherein the surface of the belt member in frictional engagement with the drive and driven pulleys is the inner surface, the outer surface of the belt member being in frictional engagement with the arcuate surface of the friction altering means.

4. The controllable loading system as defined by claim 1 wherein the friction altering means is mounted on the frame in movable relation to the belt member, the friction altering means having an arcuate surface in frictional engagement with the belt member, the movable mounting of the friction altering means comprising a portion of the tension adjusting means.

5. The controllable loading system as defined by claim 4 wherein the arcuate surface of the friction altering means is movable to adjust the tension in the belt member, the tension in the belt member controlling the torque on the rotating means required to operate the controllable loading system at any given constant speed.

6. The controllable loading system as defined by claim 1 including a lever arm pivotally mounted on the frame, the friction altering means being mounted on the lever arm in fixed relation thereto, the lever arm comprising at least a portion of the tension adjusting means.

7. The controllable loading system as defined by claim 6 wherein the lever arm has one end pivotally mounted on the frame, the friction altering means including a pair of arcuate surfaces in frictional engagement with the belt member.

8. The controllable loading system as defined by claim 7 wherein the surface of the belt member in frictional engagement with the drive and driven pulleys is the inner surface, at least one of the arcuate surfaces being in frictional engagement with the outer surface of the belt member.

9. The controllable loading system as defined by claim 8 wherein one of the arcuate surfaces is in frictional engagement with the outer surface of the belt member and the other of the arcuate surfaces is in frictional engagement with the inner surface of the belt member.

10. The controllable loading system as defined by claim 8 wherein one of the arcuate surfaces is mounted at the one end of the lever arm in fixed relation thereto, the other of the arcuate surfaces being mounted intermediate the ends of the lever arm in fixed relation thereto.

11. The controllable loading system as defined by claim 10 wherein the arcuate surface mounted at the one end of the lever arm is in frictional engagement with the inner surface of the belt member and the arcuate surface mounted intermediate the ends of the lever arm is in frictional engagement with the outer surface of the belt member.

12. The controllable loading system as defined by claim 11 wherein one of the arcuate surfaces faces generally perpendicular to the lever arm in one direction and the other of the arcuate surfaces faces generally perpendicular to the lever arm in the opposite direction.

13. The controllable loading system as defined by claim 7 including means for applying a force to the other end of the lever arm to provide tension in the belt member, the force being directed to cause the arcuate surfaces to be urged against the belt member to thereby control the torque on the rotating means required to operate the controllable loading system at any given constant speed, the force applying means comprising at least a portion of the tension adjusting means.

14. The controllable loading system as defined by claim 13 wherein the force applying means is adapted to adjust the tension in the belt member, the force being directed generally perpendicular to the lever arm at a distance from the pivotal mounting in moment arm fashion.

15. The controllable loading system as defined by claim 14 wherein the force applying means includes a spring extending from the lever arm to the frame and means associated with the spring for adjusting the tension in the belt member.

16. In a controllable loading system having a rotatable member mounted on a frame together with means for rotating the rotatable member, a drive pulley operatively associated with the rotating means and a driven pulley operatively associated with the rotatable member, and an endless belt member drivingly interconnecting the drive and driven pulleys, the belt member imparting rotation of the rotating means to the rotatable member through frictional resistance relative to the drive and driven pulleys, the belt member having a surface in frictional driving engagement with the drive and driven pulleys and having a tension side and a slack side, the improvement comprising:

means for providing a resistive load on the tension side of the belt member, said resistive load means including tension adjusting means for providing a fixed resistive load on the rotating means at any given constant speed of the rotatable member, the resistive load on the rotating means normally increasing or decreasing during any acceleration or deceleration of the rotatable member until the rotatable member again reaches a constant speed, said resistive load means also including friction altering means for providing enhanced variations in resistive load on the rotating means during any changes in speed of the rotatable member;

said tension adjusting means including a lever arm having one end pivotally mounted on the frame, said friction altering means including a pair of arcuate surfaces mounted on the lever arm, the surface of the belt member in engagement with the drive and driven pulleys being the inner surface, the arcuate surfaces also being in frictional engagement with the belt member on the tension side thereof, and at least one of the arcuate surfaces being in frictional engagement with the outer surface of the belt member; and said tension adjusting means also including means for applying a force to the other end of the lever arm, the force being directed to cause the arcuate surface to be urged against the belt member;

the variations of resistive load resulting from changes of speed of the rotatable member through the rotating means and the belt member being multiplied by a factor dependent upon the angle of engagement of the belt member with the arcuate surfaces of the friction altering means to provide the enhanced variations in resistive load;

said tension adjusting means being operatively associated with said friction altering means to vary the torque on the rotating means required to operate the controllable loading system at any given constant speed;

whereby the torque on the rotating means required to rotate the rotating member through the belt member can be varied for both constant speed and changing speed operation by the controllable loading system.

17. The controllable loading system as defined by claim 16 wherein one of the arcuate surfaces is in frictional engagement with the outer surface of the belt member and the other of the arcuate surfaces is in frictional engagement with the inner surface of the belt member.

18. The controllable loading system as defined by claim 16 wherein one of the arcuate surfaces is mounted at the one end of the lever arm in fixed relation thereto, the other of the arcuate surfaces being mounted intermediate the ends of the lever arms in fixed relation thereto.

19. The controllable loading system as defined by claim 18 wherein the arcuate surface mounted at the one end of the lever arm is in frictional engagement with the inner surface of the belt member and the arcuate surface mounted intermediate the ends of the lever arm is in frictional engagement with the outer surface of the belt member.

20. The controllable loading system as defined by claim 19 wherein one of the arcuate surfaces faces generally perpendicular to the lever arm in one direction and the other of the arcuate surfaces faces generally perpendicular to the lever arm in the opposite direction.

21. The controllable loading system as defined by claim 20 wherein the force applying means is adapted to adjust the tension in the belt member, the force being directed generally perpendicular to the lever arm at a distance from the pivotal mounting in moment arm fashion, the force applying means varying the torque on the rotating means required to operate the controllable loading system at any given constant speed.

22. The controllable loading system as defined by claim 21 wherein the force applying means includes a spring extending from the lever arm to the frame and means associated with the spring for adjusting the tension in the belt member, the spring and spring adjusting means comprising at least portions of the tension adjusting means operatively associated with the friction altering means.

* * * * *